Feb. 16, 1971    L. GOTTLIEB ET AL    3,564,545

MASTER FUNCTION HAND-OFF SYSTEM

Filed May 6, 1969

INVENTORS
LOTHAR GOTTLIEB
MARTIN R. BATES
BY Alexander & Dowell
ATTORNEYS.

United States Patent Office 3,564,545
Patented Feb. 16, 1971

3,564,545
MASTER FUNCTION HAND-OFF SYSTEM

Lothar Gottlieb, Williamsville, and Martin R. Bates, Kenmore, N.Y., assignors to Sierra Research Corporation, a corporation of New York Filed May 6, 1969, Ser. No. 822,195
Int. Cl. G01s 9/56
U.S. Cl. 343—6.5 12 Claims

ABSTRACT OF THE DISCLOSURE

In a system for synchronizing a plurality of mobile units to a repeating cycle of time slots comprising an established worldwide or system-wide time base to which the various mobile units are synchronized, but to different degrees, the present improvement is based upon the fact that some units are well synchronized and can become synchronization donors with respect to other less-well synchronized units, and that there are substantial benefits to be obtained from frequently handing-off the master function among those well-synchronized units. The present system provides means for accomplishing this handing-off of the function of synchronization donor in an orderly manner which will minimize the likelihood that an any particular moment there will be no synchronization donor or that there will be more than one synchronization donor within radio range of other mobile units, which comprise the synchronizees.

Figure 1:
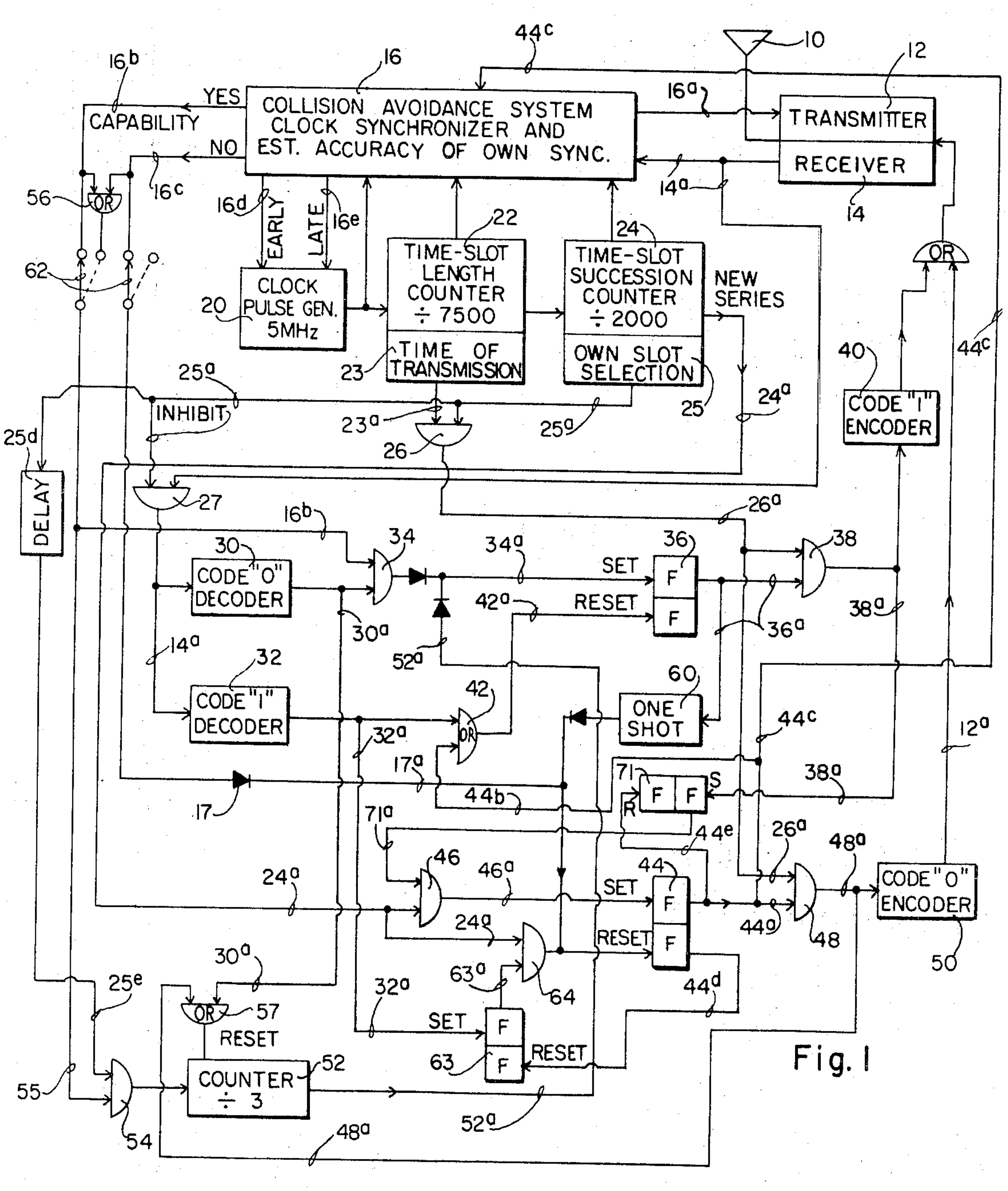

This invention relates to a system for improving the synchronization of time clocks in mobile units to a common established repeating base of time slots, which are each occupied by no more than no mobile unit, and more particularly relates to a system for handing-off in an orderly manner the function of synchronization donor among various units which have the capability of assisting other synchronizee units to become highly synchronized.

The present system will be described with particular reference to the problems involved in synchronizing aircraft to a worldwide time base, although it is to be clearly understood that the system has utility when used in connection with other types of mobile units, such as land units or marine units, for instance to synchronize their systems to a common local time base.

In a practical system for synchronizing aircraft to a common master time base, it is generally assumed that ground stations will themselves be accurately synchronized to the master time base, and that aircraft units can then obtain synchronization from a ground station in any one of a number of different ways, some of which are the subject matter of various patents, such as the Michnik et al. Pat. 3,336,591, the Graham Pat. 3,183,504, the Minneman Pat. 2,869,121 or the Perkinson Pat. 3,250,896, etc. Most of these are useful in synchronizing between two mobile units as well as between a ground unit and an aircraft. As long as synchrnizee aircraft are within useable radio range of an equipped ground station, no problem of synchronization exists. The problems begin to become serious when one is attempting to synchronize aircraft to worldwide master time when the synchronizee aircraft are located in more remote areas where they are out of touch with such ground stations and must therefore rely upon other better-synchronized aircraft to act as synchronization donors. A difficulty may also occur in the case where a synchronizee seeking synchronization from other aircraft receives confusing responses from several different aircraft in the vicinity, each of which undertakes to become a synchronization donor. Another type of difficulty occurs where there are two isolated groups of aircraft approaching each other, each group enjoying synchronization among its own members but wherein there is some disparity between the degree of synchronization of the two groups with said established master time. In other words, this situation is similar to the previously described situation because as the two groups begin experiencing radio contact with each other there will be several aircraft each capable of being a synchronization donor, and all undertaking synchronization function with possible confusing results.

The present invention provides means for handing the master donor function around among a plurality of well synchronized mobile units in an orderly fashion in order to reduce the likelihood that several units within radio range of each other will seek to become synchronization donors simultaneously, and to reduce the likelihood that although there may be units available to perform a synchronization function such units simply might not do so in the absence of an orderly system assisting them to assume the master function at an appropriate moment.

The present disclosure assumes the existence of a master time base, regardless of how it came into existence, for instance by synchronization of ground stations or perhaps even arrived at by consensus as suggested in Graham Pat. 3,262,111. The present system further assumes a degree of synchronization among the various mobile units sufficient to at least recognize the occurrence of various time divisions in the over-all cycle, for instance the boundaries of epochs, this degree of synchronization being assumed as a starting point for present purposes, and being described for instance in the above mentioned Michnik patent and the above mentioned Perkinson patent under the heading of "coarse synchronization." The illustrated embodiment further assumes in general the unique occupancy of a time slot by each of the mobile units to the exclusion of other units in the same time slot, although there may be vacancies between occupied slots. The manner of slot acquisition also forms no part of the present invention and may be accomplished either by slot assignment, or by some slot acquisition system, such as that described in Chisholm Pat. 3,161,869, wherein aircraft listen to determine the possibility of double occupancy in their selected time slots, and then move to other slots if they become aware of double occupcny.

Current commercial airline time sharing schemes include repeating eras of time slots, each era including 2000 time slots, and the eras alternating in character between odd numbered eras in which ground stations provide synchronization to the aircraft, and even numbered eras during which synchronization is obtained from aircraft donors. Although the precise nature of the time division is of no particular importance in the present disclosure, the above mentioned system set up by the Air Transport Association of America provides a good practical background for the illustrative embodiment discussed in the present specification.

It is probable that at any particular moment there will be plural different types of aircraft, some of which are highly equipped and include accurately synchronized time clocks plus the capability of becoming synchronization donors, and others of which have less-well synchronized time clocks and comprise synchronizee units which must receive synchronization at frequent intervals in order to retain the capability of reasonable collision avoidance performance.

Assuming as many as 2000 time slots, obviously at any particular moment in any particular location there will be a certain number of slots which are accompanied by aircraft, and probably a large number of unoccupied slots. Moreover, many of the slots will be occupied by aircraft having equipment capability which is less than that necessary to make them eligible as synchronization donors.

Thus, it is not practical to simply hand the master function from the aircraft occupying one slot to the occupant of the next adjacent slot, since the adjacent slot might be either unoccupied or else occupied by an aircraft having less than adequate donor capability.

It is another important object of the invention to provide a system for handling the master function from a present donor unit to another available donor unit while at the same time avoiding the possibility that no donor will exist for a damaging length of time, or that two donors will simultaneously exist within radio range of each other. It is convenient to have a synchronization donor continue that function for at least one complete cycle of the time base, which may comprise the ground and air sequence of eras as called for in the above mentioned ATA specification, and/or which may be somehow tied to the rotation of an azimuth antenna system of the type used in typical stationkeeping systems, all as variously proposed in prior-art patents. Moreover, in order to avoid the possibility that no aircraft may accept the handed-off donor function, it is desirable to have the aircraft which is presently performing a synchronizor function continue to so perform until it can somehow effect an agreement with another aircraft to pass the function on. For instance, an aircraft can assume the master function and then retain this function until it has completed at least one time base cycle, and while listening for a signal from another aircraft indicating the other aircraft's ability and readiness to accept the donor function. This approach can be implemented by a system which includes the transmission by the current donor aircraft of a coded signal indicating that it is presently performing the master function, and the transmission by another aircraft in another time slot of a coded signal indicating that it is ready to take over the master function.

It is therefore a major object of the present invention to provide a system in which a mobile unit transmits signals indicating when it is performing as a synchronization donor, or alternatively for indicating when it is ready and capable of performing as a donor, the system using these signals to accomplish the orderly hand-off of the master function from one unit to another. The present invention is deemed broad enough to cover the concept of transmissions in the time slots assigned to the various aircraft having donor capability of signals useful to determine when and to whom master hand-off shall occur next, there being a number of different types of signals which can be used among the various aircraft to establish a suitable non-ambiguous sequence for the performance of the master function. In view of the assumed sequential occupancy of time slots by the various aircraft having donor capability, this sequence can be conveniently used to establish a suitable donor sequence among the various aircraft having donor capability, which sequence can result in the selection of either the aircraft occupying a succeeding time slot or a preceding time slot. The present illustrative embodiment shows the former case wherein the next donor occupies a subsequent slot, but the latter case can be employed, possibly requiring a few simple changes in the logic circuitry. As a matter of fact, since the succession of time slots is a closed circle forming a repeating cycle, there is really no problem inherent in the question of whether the next donor occupies an earlier or later time slot. It is only important that all aircraft praticipating in the system observe consistent rules governing the selection of the next donor. The alternate occurrence of ground and air epochs, as provided in the above mentioned ATA specification, will not materially affect the foregoing statements concerning time slots and occupancy thereof, and comprises only one of a number of different possible alternatives to the simplified system illustrated in the subsequent portion of this specification.

Another important object of this invention is to provide a system in which the synchronization donors resynchronize other units which themselves are potential donors and which may become donors during succeeding cycles of the repeating time base. In this way, the various donor units improve their mutual time agreement, and thereby reduce the likelihood that the synchronization performed by each will differ substantially from that performed by the others. Thus, in general the simplest system described, the level of agreement is thereby increased, although it is also possible that occasionally the synchronization of a particular aircraft may be degraded by contact with a donor whose synhcronization to worldwide time is actually not as good. The circuit logic can be designed such that aircraft enjoying a higher estimated degree of synchronization will not resynchronize to another aircraft which estimates itself to be lower in the hierarchy, but will merely monitor the latter and perhaps warn of a dangerous deviation. One advantage of this system resides in the fact that in the event that all of the aircraft in a group fly into air space which is so remotely located from a ground station as to preclude further synchronization therewith, a time base can still be maintained based upon mutual agreement by the various sequential synchronization donors.

Another object of the invention is to provide in combination with a system for handing-off the master function, means for determining the approximate degree of synchronization within each mobile unit which aspires to become a synchronization donor so that the unit can determine its own capability, or a lack thereof. Means of this general type are proposed in the above mentioned ATA specification which suggests that each aircraft transmit a number beginning with the numeral 1, indicating an aircraft which has just been synchronized to a primary ground station, and adding to the numeral which it transmits another numeral indicating the number of intervening aircraft participating in the most recent synchronization effort of the present aircraft. In this way, an aircraft which had obtained synchronization fifth hand, through five other aircraft would transmit the numeral six, and an arbitrary numeral would then be selected to indicate a chain of synchronizations beyond which the aircraft would no longer consider itself well enough synchronized to operate as a donor. This type of system has utility among aircraft operating in the general vicinity of synchronized ground stations. Another way to estimate one's own synchronization capability is suggested in Bates et al. patent application Ser. No. 672,357, filed Oct. 2, 1967, now Pat. No. 3,440,652, and entitled "Hierarchy Clock Synchronization."

The present system is not strictly a synchronization-by-convergence system as suggested in Pat. No. 3,262,111 to Graham. The present system differs from the consensus "system" because of the fact that under ordinary circumstances all synchronization donor units are presumed to be synchronized very closely with ground station worldwide time, and therefore the tendency will be to converge upon ground station time rather than upon an arbitrary consensus time, although as pointed out above in the case where two isolated groups of aircraft converge upon each other and have both been out of touch with worldwide time, it may be that they would then establish a consensus time by a process of convergence upon the average time remembered by the best equipped aircraft in both groups.

Figure 2:
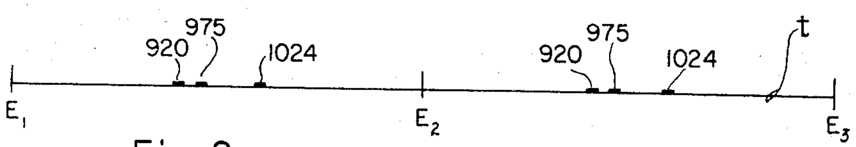

Other objects and advantages of the present invention will become apparent during the following discussion of the drawings, wherein:

FIG. 1 is a block diagram of a system suitable for installation in the various mobile units having synchronization donor capability, the circuit serving to make a determination as to when the unit in which it is installed will become a synchronization donor, and FIG. 2 is a graphical illustration of consecutive time slot epochs.

Referring now to the drawings, a complete aircraft system would provide three functions which are basically different in nature, although they are all tied to the same time clock system. One of the functions is collision avoidance and navigation, which assumes accurate clock synchronization, but in unconcerned with the means for maintaining clock synchronization. A second function is the synchronization function itself, that is, assuming the existence of a master time, the mobile units then synchronize their clocks thereto, for instance in the manner suggested in Michnik et al. Pat. 3,336,591. The third function is the selection of the master unit, and it is to this function which the present invention is addressed. Therefore, the present exemplary embodiment merely shows the first two functions in the most general of terms to help illustrate the third function in context.

In the present system it is assumed that the aircraft includes a suitable antenna 10 connected by suitable coupling means to a transmitter 12 and a receiver 14, these basic units being useful in connection with the performance of all three of the above-mentioned functions. The block 16 contains navigation and collision avoidance equipment, as well as the means for synchronizing the local clock which can be of the general type shown in the above-mentioned Michnik et al. or Perkinson patents. The block 16 also includes means for estimating the degree of its own clock synchronization. A common time clcok serves the performance of all three of the above functions, and this time clock includes a clock pulse generator 20 driving a main counter 22 which counts out the length of each time slot, for instance 1500 microseconds. At the end of each 1500 microseconds slot, the counter 22 issues a pulse to drive the counter 24 which counts out each succession of time slots, for instance amounting to a complete series of slots, one era for example. The clock synchronizer in the block 16 delivers corrective signals on the wires **16*d* and 16*e* to the clock pulse generator 20 to correct it for early and late conditions, and in turn receives suitable signals from the various time clock units in order to time the performance of its own function. The synchronizer and collision avoidance block 16 drives the transmitter 12 at appropriate moments through the wire 16*a* and receives appropriate pulse group replies or telemetry signals coming from the receiver through the wire 14*a***.

It is also assumed that the clock synchronization block 16 includes means for estimating its own clock error and thereby estimating its own capability as a synchronizer, this estimation being performed by a circuit which delivers either a "yes" or a "no" output on the wires **16*b* and 16*c*** to thereby indicate its own capability. A system for estimating such capability is disclosed in the patent application of Bates et al., Ser. No. 672,357, filed Oct. 2, 1967 and belonging to the assignee of the present disclosure, the above application now being Pat. No. 3,440,-652.

The units described thus far are included merely to show a background for and the general utility of the system, and to support the present inventive function of handing off the synchronization donor duty from one mobile unit, estimating that it has adequate capabilities as a synchronizer, to another unit within radio range which also estimates that it has adequate synchronization donor capabilities. This hand-off function must be performed in an orderly fashion designed to minimize the possibility of there being no synchronization donor, or of there being two synchronization donors at the same instant of time. For the sake of convenience, the present illustrative example purports to hand off the master synchronization function in such a manner and at such times that each donor will perform its function during one epoch, or during several epochs and that the change of synchronization donors will occur at the time boundaries between epochs.

FIG. 2 shows a time base $t$ including three epoch boundaries E1, E2 and E3, it being also satisfactory to think of these epochs as forming a circle in which points E1 and E3 merge to close the circle, the circular concept being accurate in view of the fact that the elapse of time represented by the time base $t$ in FIG. 2 really comprises a repeating cycle.

The beginning of each new era is marked by an output from the counter 24 of a pulse on the wire **24*a*, which output occurs once for every 2000 time slots. Thus, a pulse appears on the wire 24*a* marking the instants E1, E2 and E3. It is also assumed that the local aircraft occupies a unique time slot, one of the 2000 time slots counted by the counter 24, and this particular time slot is selected by a logic circuit 25 which delivers an output on the wire 25*a* which persists for the duration of the aircraft's own time slot. It is further assumed that a selection has been made of an arbitrary moment within each time slot at which an aircraft can transmit one of two signals by which it can signify either that it is now performing as a synchronization donor, by transmitting a code "zero" signal, or else that it intends to become the next synchronization donor, in the present example during the next era, this intention being signified by the transmission of a differently encoded pulse group hereinafter referred to as a code "one" signal. The arbitrary moment at which either a code "zero" or a code "one" signal can be transmitted by an aircraft within its own time slot is selected by a logic circuit 23 which delivers a pulse on the wire 23*a* at the selected moment. The outputs of the wires 23*a* and 25*a* are delivered to an AND gate 26, the signal on wire 25*a* enabling the AND gate only during the time slot occupied by the present aircraft, and the precise moment in that slot selected for transmission of a code "zero" or code "one" pulse group being then initiated via the wire 23*a* to the gate 26, whereby an output appears on the wire 26*a*** marking the instant during the unit's own time slot when it should transmit either a code "zero" or a code "one" pulse group. The system has now made available two criteria which contribute to the transmission, or lack thereof, by the aircraft of its own code "zero" or code "one" group, namely a judgment of its own clock accuracy to determine its capability as a synchronization donor, and an indication of the exact moment when one or the other of these pulse groups should be transmitted.

There are other criteria which enter into the decision to become a synchronization donor, and which enter into the determination of which era will be used for this purpose. As pointed out above, it is important that each aircraft refrain from becoming a donor if another aircraft in the vicinity is already performing that function, or is about to do so. It is also important to provide an indication of future intention to become a donor in order to avoid the situation in which each aircraft will assume that another aircraft will become the next donor. Another system requirement is that the various aircraft having the donor capability establish in advance which aircraft shall be the next donor, and that they accomplish this necessity in an orderly fashion.

In general, the present illustrative embodiment bases its selection of the next master unit upon the orderly succession of time slots occurring on the time base $t$ shown in FIG. 2. Between each of the epoch boundaries E there are 2000 time slots, and each aircraft in the vicinity occupies a unique one of these time slots, and there will probably be a large number of unoccupied time slots under typical circumstances. There is an advantage from the point of view of simplicity in having capable aircraft perform their master functions in the order established by the time slots which they occupy, whereby an aircraft occupying an early time slot will become a synchonization donor prior to an aircraft occupying a later time slot, although there is no reason by the handing off of the function could not also be accomplished in the contrary order.

Assume for example that an aircraft occupies slot 920 in FIG. 2, and is the synchronization donor during the present era. The operation of the circuitry about to be described is such that the aircraft occupying slot 920 will transmit a code "zero" signal during its own time slot, and that other aircraft will thereby be informed that the aircraft in slot 920 is the present synchronization donor. If there is no aircraft occupying any of the next few slots, and the next aircraft which is capable of becoming a donor occupies slot 1024, the latter aircraft will then transmit its code "one" signal indicating to other aircraft that it intends to be the next synchronization donor, namely during the next epoch, or pair of epochs in the case where there are alternate ground and air epochs as suggested in the ATA specification mentioned above. However, if there were a capable aircraft occupying an intervening slot, such as slot 975 located between the present donor and the aircraft in slot 1024, then the aircraft in slot 975 would have transmitted its code "one" pulse prior to the transmission of the aircraft in slot 1024 and the reception of the earlier code "one" pulse by the aircraft occupying slot 1024 would be used to inhibit the latter's transmission of its code "one" pulse. Therefore, the overall plan of the present system is to have a capable aircraft in a subsequent slot transmit its code "one" (intention to become donor) signal only if not inhibited by reception of a code "one" signal transmitted in a time slot subsequent to that occupied by the present donor but preceding that occupied by the local aircraft. The block diagram shown in the lower half of FIG. 1 is intended to accomplish this and other purposes. It does so as follows:

The output of the receiver 14 on the wire **14*a* drives two decodes 30 and 32, the decoder 30 recognizing code "zero" signals from other aircraft indicating their performance of the donor function during the present era, and this decoder providing an output signal on wire 30*a*, whereas the decoder 32 decodes code "one" signals and provides an output on the wire 32*a* each time such a signal is received from another aircraft and decoded. A normally conductive gate 27 is inserted in the receiver output line 14*a*, and is blocked by an "inhibit" signal on the wire 25*a* during the local unit's own time slot so that the decoders 30 and 32** will be inoperative thereduring.

Assuming that the aircraft in slot 920 is the donor during the present epoch, and that the local aircraft under discussion occupies one of the later time slots, its decoder 30 will provide an output to the gate 34 upon reception of the code "zero" signal from the present donor. The gate 34 is an AND gate and is enabled only when there is a signal on the wire **16*b* indicating that the local aircraft estimates itself to be well enough synchronized to become a master synchronization donor. Assuming this to be the case, the AND gate 34 will deliver an output on the wire 34*a* to set the flipflop 36 36 and cause it to provide an output on the wires 36*a*. The output on the wires 36*a* will remain as long as the flipflop 36 is in set condition, but the AND gate 38 will block the signal from appearing on wire 38*a* until the arrival of the present unit's own time slot, and, in fact, the particular instant therein predetermined for the transmission of its own coded signals as determined by the logic circuit 23 and the output on wire 23*a*. When this instant occurs, an output will appear on wire 38*a* to drive the encoder 40, when in turn triggers the transmitter 12 to transmit a code "one" signal during the unit's own time slot. The output on wire 38*a* also sets a flipflop 71 to provide an enabling signal on wire 71*a* to one input to the gate 46**, for the purpose hereinafter stated.

On the other hand, if some aircraft occupying an intervening time slot later than the present donor's time slot, but earlier than the local aircraft's time slot, should transmit its own code "one" pulse group, the reception of this pulse group would provide a signal on the wire **14*a* to the local decoder 32 which would then provide an output on wire 32*a* which would pass through the OR gate 42 and provide a signal on wire 42*a* to reset the flipflop 36 and remove the signal from wire 36*a*, thereby disabling the gate 38. Thus, the flip flop 36** will have been reset by an intervening code "one" signal occuring in a time slot earlier than the time slot occupied by the present aircraft, whereby the present aircraft will transmit no code "one" signal when its own time slot occurs during the era under discussion.

Conversely, assuming that no intervening aircraft was heard by the local aircraft after the donor aircraft occupying time slot 920 transmitted its own "zero" signal, the flipflop 36 in the local aircraft will remain set so that it will transmit its own code "one" signals during the same era. When the next era occurs, the present aircraft will then become the donor. It will assume this function when its own flipflop 44 is moved into set condition by an output on the wire **46*a* from the AND gate 46 which was enabled as a result of setting the above mentioned flipflop 71. The lower input of the AND gate 46 will be pulsed at the beginning of the new era by the epoch signal appearing on wire 24*a*, thereby initiating the signal on wire 46*a* to set the flipflop 44. The outputs on wires 44*a*, 44*b*, and 44*c* perform three functions, namely the output on wire 46*b* passes through the OR gate 42 to reset the flipflop 36 and thereby remove the signal from the wire 36*a*; and the output on wire 44*a* enables the lower input to the AND gate 48 so that eventually when an output appears on the wire 26*a* to signify the predetermined moment of transmission for pulse groups occurring within the local aircraft's own time slot, an output will appear on the wire 48*a* to drive the encoder 50 which then triggers the transmitter 12 via the wire 12*a* to transmit a code "zero" pulse group signifying that the local aircraft is now the synchronization donor. The present aircraft will continue as donor by transmitting code "zero" signals in its own slot during each successive epoch so long as the flipflop 44 remains in set condition. The output signal from the flipflop 44 will also be taken via the wire 44*c* to enable the clock synchronizer equipment within the box 16 to perform synchronization functions in behalf of other aircraft requesting improvement of their synchronization condition so long as the present unit is the donor. An output on wire 44*e* resets the flipflop 71 after the flipflop 44** is changed to set condition.

There are several ways in which the local aircraft can cease being the donor. One way is to have the local aircraft receive a code "one" signal from another aircraft occupying a subsequent slot indicating that it will be the next donor, such a signal appearing on the wire **14*a* and passing through the decoder 32 and initiating output traveling downwardly via the wire 32*a* to pulse the set terminal of flipflop 63 an denergize the wire 63*a* and enable the gate 64. When the next epoch start pulse appears on the wire 24*a* it will send a pulse through the gate 64 and actuate the reset terminal of the flipflop 44. Thus, a code "one" signal from an aircraft occupying a subsequent slot indicating that it will be the next donor operates to reset the flipflop 44 and place the local system in dormant condition so far as synchronization donations are concerned, but this only occurs at the ends of the epoch. An output on the wire 44*d* then resets the flip-flop 63. Another way to have the local system cease performing as a synchronization donor is to have it lose radio contact with all other possible donors for a certain number of epochs. This loss of contct might occur and persist for an indefinite period, and it is therefore desirable to have some means for indicating to the local aircraft that it has in effect run out of range. In other words, the capability signal on the wire 16*b* will eventually give way to a "no capability" signal on wire 16*c*, as a result of which an output will be applied by way of the isolation diode 17 and the wire 17*a* to the reset terminal of the flipflop 44 to turn off the flipflop and thereby return the local system to non-donor condition. A oneshot 60 is provided to reset the flipflop 44 whenever the flipflop 36 is set to insure that both will not become set simultaneously. One function of the oneshot 60** is to insure that the local unit will cease being a donor if a code "zero" signal is received from any other unit in an epoch when the local aircraft has assumed donor status.

The unit is provided with a switch 62 that can be thrown by the operator whenever it is intended that the local aircraft should become a master unit, divorced from said world-wide master time, for instance in a case where the aircraft is to assume the function of synchronizing a group of other aircraft all located in an isolated region where there are no master-time-keeping ground stations or other donor aircraft to which the present unit can be synchronized. When the switch 62 is thrown to its dashed-line position, the wire 55 going to the gate 54 is always enabled through the OR gate 56 regardless of whether there is output on the YES wire 16*b* or on the NO wire 16*c*. On the other hand, there is another possible circumstance which might prevent the present aircraft from becoming a donor even though it had full capability at the present time. Recalling that usually it is a code "zero" signal received from another aircraft and operating through the AND gate 34 which sets the flipflop 36, and thereby sets in motion the eventual assumption by the present aircraft of the master function, if there is no other aircraft present and already performing the master function itself, the present aircraft will receive no code "zero" signal to start it on its way toward becoming a master unit. In order to avoid the possibility of having the local unit fully capable with the switch 62 in the solid-line position, but remaining dormant because it does not receive a code "zero" signal from another aircraft, this system is provided with the counter 52 which counts a certain number of epochs during which no code "zero" signal is received from any other aircraft, and then acts to place the present aircraft on the air as a synchronization donor, if it is capable and the switch 62 is on the solid-line position. If the switch 62 is in the dashed-line position, the unit will become a donor whether it is capable or not. An arbitrary selection has been made, for illustrative purposes, of three epochs before the present aircraft commences to take over the master function. The counter 52 is counted upwardly by output from the AND gate 54, the lower terminal of this gate being enabled by an output from the wire 55. The upper input terminal of the AND gate 54 is pulsed just after one's own time slot by a signal taken from wire 25*a* through a brief delay 25*d*, and it is these pulses which are counted by the counter 52. If no code "zero" signal is received from any aircraft, to provide a signal on wire 30*a* to reset the counter 52 through the OR gate 57 the counter 52 is counted upwardly by each pulse on the wire 25*e* until the counter 52 counts to "3" and provides an output on the wire 52*a* to pulse the set terminal of the flipflop 36 and set the present system into motion to provide during the present epoch a code "one" signal indicating intent to synchronize during the next epoch. If no code "one" signal is received from any other unit during this epoch, the local unit will transmit during the next epoch its own "zero" signal. When it transmits its own code "0" signal, the output on wire 48*a* resets the counter 52 through the OR gate 57. The present system will then perform as a master unit until it either receives a code "one" signal from another aircraft indicating its intention to take over the master function, or until it receives a code "zero" signal from any aircraft outside of its own time slot, or until its own capability runs out and the signal switches from the wire 16*b* to the wire 16*c* to turn off the flipflop 44.

When other aircraft are present and cooperating as alternate masters, however, the counter 52 will probably never reach the count of "3" which would provide an output on the wire 52*a*. This is because the reception of other code "zero" signals from other aircraft will cause signals to appear on the wire 30 to keep resetting the counter 52 and prevent it from reaching overflow.

In summary, a system has been provided which will permit operation of an aircraft having suitable capability as a master unit, either cooperatively with other aircraft or in the absence thereof, in any one of the following situations, namely: where no signals are received from any other aircraft; where code "zero" signals are received from another aircraft; or where code "one" signals are received prior to the present unit's own slot.

Having thus described an illustrative embodiment of the present invention, we now present the following claims.

What is claimed is:

1. In a mobile unit navigation system wherein at least some units include means providing them with the capability of functioning as clock synchronization donors with respect to other synchronizee units in the vicinity by exchange of transmitted and received signals therebetween, means for handing-off the donor function in an orderly fashion among the capable units comprising:

(a) means in a capable unit now performing the donor function for periodically transmitting a first type signal to the other units indicating itself to be the current donor;

(b) means in other capable units triggered by reception of said first-type signal for respectively enabling them to transmit a second-type signal indicating their own capability to take over the donor function;

(c) means in said other capable units for disabling said enabling means in response to reception of a second-type signal from another unit, and operative during each interval after reception of said first-type signal and until the transmission of its own second-type signal; and (d) means in said other capable units responsive to transmission of its own second-type signal to assume the synchronization donor function and thereafter periodically transmit first-type signals.

2. In a system as set forth in claim 1, means in each donor unit for relinquishing performance of said donor function upon reception of a second-type signal from another unit.

3. In a system as set forth in claim 1, means in each capable unit for accumulating an elapsed time longer than the time between said periodically transmited first-type signals, and for delivering an enabling signal at the end of said elapsed time to cause the unit to transmit its second-type signal; and means responsive to reception of first-type signals from other units to reset said accumulating means.

4. In a system as set forth in claim 1, means in each mobile unit now performing a donor function operative to relinquish said donor function upon receipt of a first-type signal from another mobile unit.

5. In a system for synchronizing time clocks in mobile units to a common established repeating cycle of time slots at least some of which are occupied by mobile units equipped with clock synchronization means including means for transmitting and receiving pulse signals, the system including means for periodically handing off from one capable unit to another the function of synchronization donor with respect to other units which perform as synchronizees, comprising:

(a) means in a capable unit currently performing as synchronization donor for enabling the transmission in its own time slot of a first pulse signal indicating to other units that it is now a donor;

(b) means in each other capable unit responsive to the reception of a donor unit's first pulse signal for enabling the transmission of a second pulse signal indicating to other units its own capability of becoming a donor unit; and (c) means in each other capable unit for initiating said transmission in its own time slot of its second pulse signal and for assuming the donor function thereafter when it has received no second pulse signal from any other unit during the interval between the reception of the current donor unit's first pulse signal and its own time slot, and for inhibiting transmission of its own first pulse signal and assumption of the donor-function during the present cycle of time slots if it receives a second pulse signal from another unit during said interval.

6. In a system as set forth in claim 5, means in each current donor unit for retaining the donor function until reception of a second pulse signal from another unit subsequent to the transmission of its own first pulse signal, and including means for ceasing to perform the donor function after reception of such a second pulse signal.

7. In a system as set forth in claim 5, each donor unit having means for retaining the donor function for the duration of the complete time cycle following the transmission of its own first pulse signal, and having means responsive to the reception of a second pulse signal from another unit during that time cycle for disabling said retaining means at the end of that time cycle.

8. In a system as set forth in claim 5, each donor unit having means for retaining the donor function for the duration of the complete time cycle which includes the donor's time slot in which it transmited its own first pulse signal, and having means responsive to the reception of a second pulse signal from another unit during a time slot which is subsequent to the donor's time slot in the second time cycle for disabling said retaining means at the end of that time cycle.

9. In a system as set forth in claim 5, wherein each capable unit includes means for estimating the accuracy of synchronization of its own clock, means responsive to estimation of satisfactory accuracy to enable transmissions of its own first and second pulse signals, and responsive to estimation of unsatisfactory accuracy to inhibit tranmissions of such signals.

10. In a system as set forth in claim 9, means responsive to estimation of satisfactory accuracy for counting out a period of time at least equalling one complete time cycle and for actuating the local system to transmit its own second pulse signal at the end of the completed count of that period, and including means responsive to the reception of pulse signals from another unit during counting of said period to reset said counting to commence all over again.

11. In a system as set forth in claim 5, said enabling means comprising bistable means, wherein the means for enabling transmission of said first pulse signals is set by the commencing of a new time cycle provided that the means for enabling transmission of the second pulse signals is also set, and the system further including means for resetting the latter enabling means in response to setting of the former enabling means.

12. In a navigation system wherein mobile units have time clocks and at least some of the units include means providing them with the capability of functioning as clock-synchronization donors with respect to other synchronizee units in the vicinity by exchange of transmitted and received signals therebetween, means in the capable units for transmitting first signals and second signals respectively indicating to other units which unit is the present donor unit and which units are waiting to become donor units thereafter; and means in the capable units responsive to the successive order in which said signals occur for handing-off the master function from the present donor unit to one of the waiting units as determined by said successive order.

References Cited

UNITED STATES PATENTS

| | | | |
|---|---|---|---|
| 3,336,591 | 8/1967 | Michnik et al. | 343—6.5 |
| 3,440,652 | 4/1969 | Bates et al. | 343—6.5X |

RODNEY D. BENNETT, Primary Examiner

M. F. HUBLER, Assistant Examiner

U.S. Cl. X.R.

343—6.8, 7.5